April 7, 1953  T. G. FREDERICK  2,633,773
CLAW OPERATED FILM-FEED SPROCKET DRIVE
Filed April 29, 1947  2 SHEETS—SHEET 1
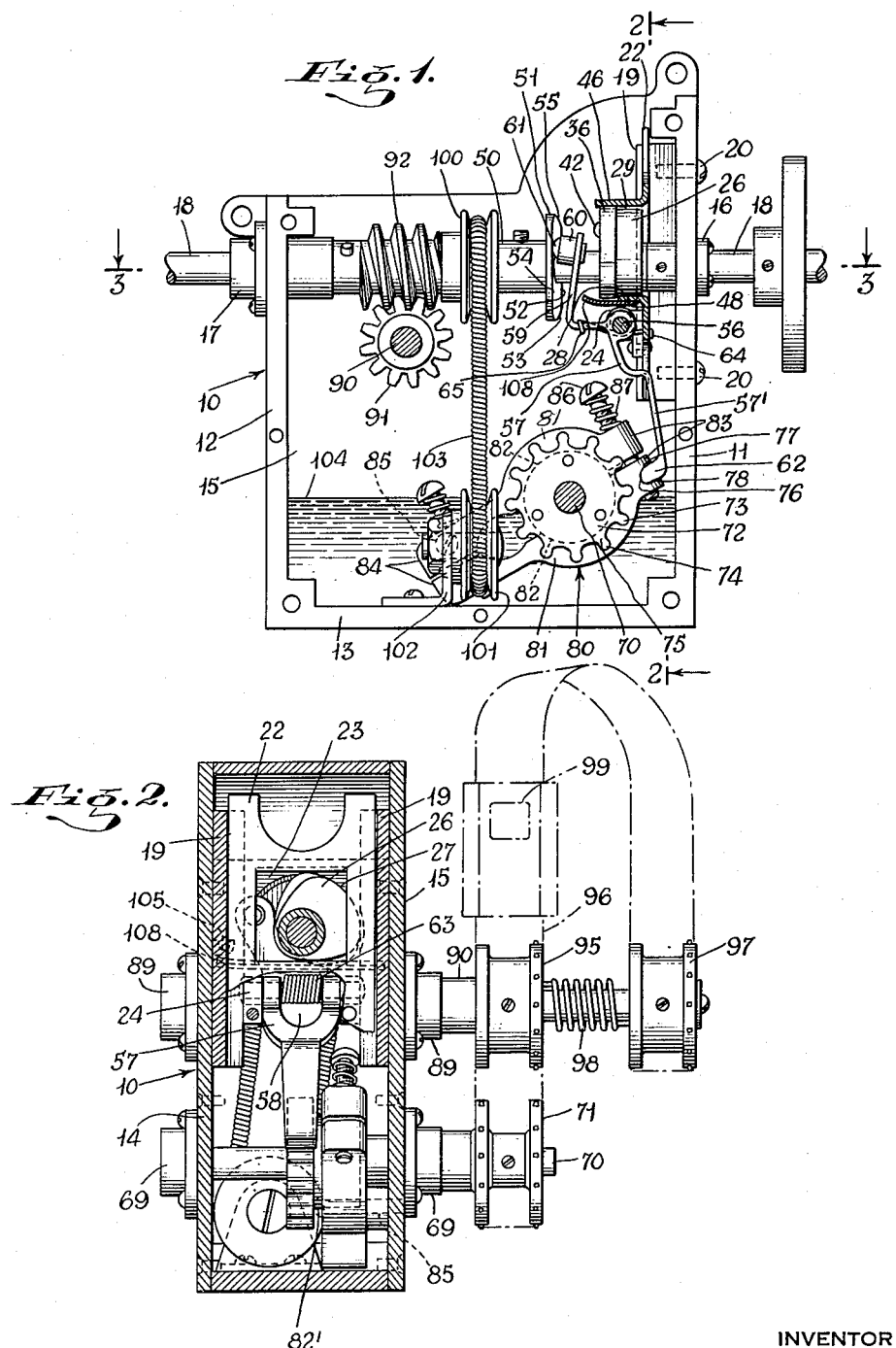
INVENTOR
TILGHMAN G. FREDERICK
BY
ATTORNEY April 7, 1953 T. G. FREDERICK 2,633,773
CLAW OPERATED FILM-FEED SPROCKET DRIVE
Filed April 29, 1947 2 SHEETS—SHEET 2
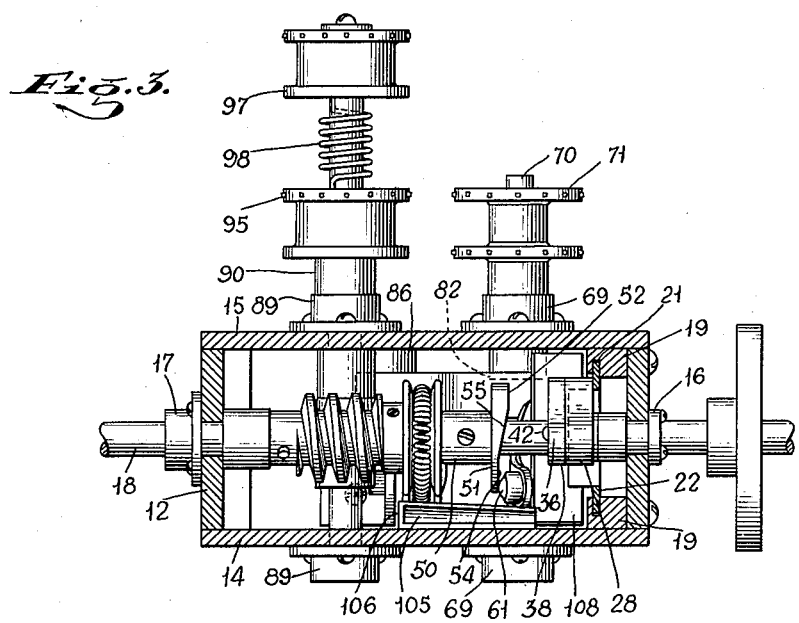
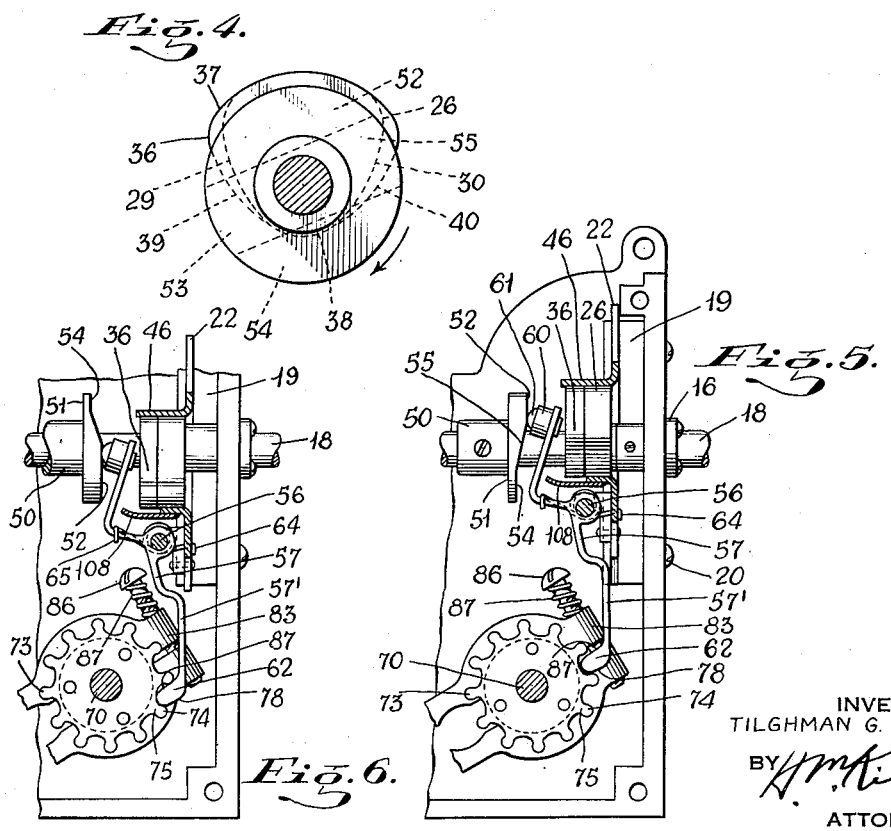
INVENTOR
TILGHMAN G. FREDERICK
BY H. M. Kilpatrick
ATTORNEY Patented Apr. 7, 1953

2,633,773

UNITED STATES PATENT OFFICE 2,633,773

CLAW OPERATED FILM-FEED SPROCKET DRIVE

Tilghman G. Frederick, New York, N. Y.

Application April 29, 1947, Serial No. 744,600

9 Claims. (Cl. 88—18.2)

This invention relates to mechanisms for feeding motion picture film and more particularly to intermittent driven sprockets for picture film feeding mechanism and to improved means for driving the sprocket. The invention relates to these and other improvements for continuous automatic projectors though it is noted that in the claims the invention is not limited to continuous projectors or to projectors.

One object of the invention is to provide an improved mechanism of this kind which will allow the sprocket and film to remain a long time stationary in film projecting and exposing position and will then operate the sprocket to feed the film quickly to the next projecting or exposing position and then stop the sprocket and film with an easy smooth movement which will not cause vibration or injure the film.

Other objects of the invention are to provide an improved oiling system for a film feeding mechanism and to provide a film feeding device of this kind which is substantially noiseless in operation and free from lost motion or vibration, and which will run a very long time without wearing out the film.

Additional objects of the invention are to effect simplicity and efficiency in such apparatus and to provide an extremely simple apparatus of this kind which is very economical, durable and reliable in operation, and economical to manufacture and easy to install.

Still other objects of the invention will appear as the description proceeds; and while herein details of the invention are described in the specification and some of the claims, the invention as described in some of the broader claims is not limited to these, and many and various changes may be made without departing from the scope of the invention as claimed in the broader claims.

The inventive features for the accomplishment of these and other objects are shown herein in connection with an improved reciprocatory-claw operated sprocket film feed mechanism which briefly stated, includes a film feed mechanism carried in and by a housing having side and bottom walls, a reciprocatory member being vertically guided on an end wall and having thereon abutments transverse to its path. A rotary drive shaft mounted in said end walls carries fast thereon cams engageable with abutments and contoured to reciprocate the member and hold it stationary at each limit of movement.

A sprocket shaft mounted in said side walls below said drive shaft carries an exterior master sprocket, and carries a toothed wheel within the housing. A lever pivotally mounted on said reciprocatory member has a lower claw engageable between the teeth of the toothed wheel, the upper end of the lever being urged against a cam face of an in-and-out cam on said main shaft, said in-and-out cam face being contoured to hold the claw between and away from said teeth when the member moves in respectively opposite directions.

A friction block having a bearing bore snugly frictionally received on the sprocket shaft and having a radial split extending to the bore, is provided with means to hold the disk from rotating and with means for adjustably yieldably pressing the walls of the split toward each other to adjust the friction on the sprocket shaft to prevent undesired vibration.

A worm fast on the rear of the main shaft within the housing, engages a worm thread on a countershaft rotatable in the rear corners of the side walls and projecting near the master sprocket and carrying a supply and take-up sprocket on the projecting part of the countershaft for conducting film to and from a film gate and the master sprocket.

A grooved pulley fast on the main shaft and a grooved idler rotatably mounted at the bottom of the housing carries a belt disposed over said pulley and idler for carrying oil filling the lower part of the housing of the main shaft where it spreads to various parts to lubricate them.

In the accompanying drawing showing, by way of example, one of many possible embodiments of the invention, Fig. 1 is a side elevation of the mechanism, partly in vertical section through the abutments, a side wall of the housing being removed;

Fig. 2 is a transverse sectional view taken on the line 2—2 of Fig. 1;

Fig. 3 is a horizontal sectional view taken on the line 3—3 of Fig. 1;

Fig. 4 shows an enlarged diagrammatic view of the cams; and

Figs. 5 and 6 are fragmental side elevations, partly in section, showing respectively upper and lower stationary positions of the claw.

The various parts of my improved film feeding mechanism are carried in and by a narrow housing 10 having front, rear, bottom and side walls 11, 12, 13, 14, 15, the front and rear walls 11, 12 being provided with alined main forward and rear bearings 16, 17 carrying a main drive shaft 18 projecting at both ends and adapted at either end to be connected to, and rotated by, a suitable source of power.

Opposed vertical guide strips 19 held by screws 20 on the forward wall 11 have inner undercut grooves 21 (Fig. 3) on opposite sides of the shaft, said grooves receiving a reciprocatory plate member 22 slidable in said grooves and provided with a large central opening 23 receiving said main shaft, the plate being provided at its lower edge with spaced bearing ears 24 having alined bearing bores transverse to the path of the plate.

A feed cam 26 mounted fast on said main shaft adjacent to said opening has a peripheral cam face including a long outer land portion 27 of about 72 degrees and large radius, a short opposite land portion 28 of small radius and a pair of outwardly curved intermediate portions 29, 30 merging into said land portions 27, 28. A fiber take-up cam 36 mounted on said main shaft adjacent to and secured fast to the feed cam 26 has a peripheral cam face including a long outer land portion 37 of about 96 degrees and large constant radius as great as the radius of the outer land portion of the feed cam, a short opposite land portion 38 of small constant radius and a pair of outwardly curved intermediate portions 39, 40 merging into the land portions of radii respectively slightly longer than the corresponding radii of the feed cam, said portions 37, 38, 39, 40 of the take-up cam being respectively adjacent to the corresponding cam portions 27, 28, 29, 30 of the feed cam. Said cams 26, 36 are provided with a pair of small alined openings eccentric to the main shaft receiving coupling screws 42 for holding the cams against rotation relative to each other.

An upper abutment plate 46 integral with the reciprocatory plate 22 and provided from material bent from said large opening 23 is disposed above the cams and forms a horizontal upper abutment engageable with the take-up cam 36. A lower abutment plate 48 integral with the reciprocatory plate 22 below the feed cam forms a horizontal lower abutment engageable with the feed cam and terminating short of the take-up cam 36. The cam portions 27, 28, 29, 30, 37, 38, 39, 40 are of such radius and said abutments 46, 48 are of such distance apart that when the long land portion 37 of the take-up cam engages the upper abutment 46, the opposite land and intermediate portions 28, 29, 30 of the feed cam will one at a time engage the lower abutment, and when the long land portion 27 of the feed cam engages the lower abutment, the short land and intermediate portions 38, 39, 40 of the take-up cam will one at a time engage the upper abutment 46.

A cam collar 50 having a hub fast on the main shaft has a cam 51 transverse to the shaft provided with an in-and-out cam face faced toward and spaced from said cams and comprising high and low land portions 52, 54 and inclined intermediate portions 53, 55 connecting the land portions. An oscillatory shaft 56 in said transverse bores of the ears 24 carries fast thereon between said ears a lever 57 of metal plate having between its edge at said shaft a large cut-out 58. The upper part of the lever is rearwardly extended and has, between the cam collar 50 and the take-up cam 36, an upwardly extended end 59 carrying a ball-cup 60 adjacent to the periphery of the in-and-out cam and receiving a bearing ball 61 engaging the cam face of the in-and-out cam. The lower arm portion 57' of the lever 57 extends downwardly and has a rearwardly turned claw 62. A helical spring 63 carried on said oscillatory shaft at said large opening of the lever and anchored at 64 to the plate 22 and at 65 to the lever serves to press said ball against the in-and-out came face. The portions 52, 53, 54, 55 of the in-and-out cam face are designed to allow the spring 63 to hold the claw 62 rearwardly when the reciprocatory plate 22 moves downwardly and to hold the claw forwardly when the reciprocatory plate moves upwardly.

Alined bearings 69 near the lower forward corner of the side walls carry a master sprocket shaft 70 projecting at one end and carrying a master feed sprocket 71, such shaft carrying fast thereon within the housing a laminated toothed wheel 72 made of hard fiber provided with large widely spaced teeth 73 substantially sprocket-tooth distance apart, each tooth 73 comprising a somewhat cylindrical outer portion 74 axially parallel to the sprocket shaft and a slightly narrower inner neck 75. Said claw 62 is made thick from top to bottom and has a rounded inner end 76, a curved upper face 77, and a lower face 78 curved approximately coaxially with the oscillatory shaft 56. The portions of said cams 26, 36, 51, the lengths of the lever arms 57', 59 and the faces 77, 78 of the claw are so related that the claw is in retracted position as it moves upwardly, and then while the reciprocatory plate is stationary, the claw moves inwardly, out of contact with the tooth next above the claw to cause the face 78 to slide evenly on the upper face of the cylindrical portion 74 of a tooth next below, just above the level of the axis of the sprocket shaft 70. Then the claw moves downward and engages the cylindrical portions 74 of both adjacent teeth, as in Fig. 6, before the claw reaches its lower limit of movement, and is retracted while the reciprocatory plate 22 is stationary in its lowest position, thus top revent overfeed of the toothed wheel. The curved claw faces 77, 78 avoid movement of the toothed wheel during insertion and retraction of the claw.

A friction device 80 comprises cooperating members 81 of compressed fiber together constituting a disk-shaped body having large half bores 82 providing a large bearing bore snugly received on a drum 82' (Fig. 2) fast on the master sprocket shaft 70 between the toothed wheel and the side wall, the block halves having pairs of spaced ears 83, 84, there being a space of appreciable width between the block halves extending to the drum 82'. A screw 85 passing through an ear 84 into the adjacent side wall, and a collar 86 (Fig. 3) on the screw between such ear and said side wall cooperate to hold the disk from rotating and to hold the device 80 spaced from the side wall. Each pair of said ears is provided with alined bores, the upper bore being larger in diameter than the lower bore, said bores receiving a headed adjusting screw 86 passing loosely through the upper bore and having threaded connection in the lower bore. A helical spring 87 compressed between the screw head and the upper ear, serves for adjustably yieldably pressing the ears towards each other to adjust the friction of the block half at the bore 82 upon the drum 82' to hold the shaft stationary without vibration while the claw is disengaged from the toothed wheel 72.

Alined bearings 89 near the upper rear corners of the side walls carry a countershaft 90 projecting near and spaced from the master sprocket 71. Said shaft 90 carries fast thereon within the housing a worm wheel 91 meshing with a worm 92 mounted fast on the rear of the main shaft. A take-up sprocket 95 fast on the countershaft in the plane of the master sprocket, is adapted to receive film 96 from the master sprocket and deliver it to a take-up reel (not shown). A supply sprocket 97 loose on the countershaft, and off-set from said plane is yieldably held against rotation, relative to the shaft 90, by a helical spring 98 received on the countershaft 90 and having its end anchored to the sprockets 95, 97, to allow yielding movement of the supply sprocket 97 to yieldably draw film from a supply reel and deliver it to a film gate 99 and thence to the master sprocket 70.

A grooved pulley 100 fast on the main shaft between the worm 92 and in-and-out cam, and a grooved idler 101 rotatably mounted on a bracket 102 mounted on the bottom wall 13 carry a belt 103 of helical spring wire disposed over said pulley and idler. A trough 105 (Figs. 2 and 3) mounted on the wall 14 has a closed upper end 106 and almost touches the belt 103 and inclines downwardly to and forwardly to a position near the lower part of the cam 36.

The lower part of the housing is filled with lubricating oil 104 up to a level to cover said idler pulley and the sprocket shaft 70 and part of the toothed wheel 72. When the mechanism is operated, the claw and tooth wheel are lubricated, and oil is carried by capillary attraction of the belt 103 to the grooved pulley 100, whence it spreads to the worm 92, the worm wheel, the trough 105, the cams 26, 36, 51, said ball 61 and the various bearings. A deflector plate 108 having a margin secured to the lower face of the lower abutment plate and extending to near said guides 19, and upwardly bent under and projecting beyond the take-up cam 36, and under the end of the trough 105 serves to deflect oil from the trough to the cams 26, 36, the guides 19 and thence to the grooves 21 and the side edges of the reciprocating plate 22.

The opening of the shutter (not shown) is of such size as to remain open through about 90 degrees of the rotation of the shaft 17, and has a position to open just after the plate member 22 has reached its uppermost position of Fig. 1 and to close a few degrees before the plate member 22 starts its downward travel. As the radius of the cam portion 37 is constant, the plate member 22 and the film are not moved while the shutter is open. The cams rotate in the direction of the arrows of Fig. 4.

After the plate member reaches its uppermost position and before it begins to descend an inclined cam face 53 (Figs. 1 and 4) and the raised land cam face 52 of the in-and-out cam reach the ball 61 of the follower lever thereby causing the claws 62 to enter between teeth 73 as in Fig. 5.

The cam portions 30, 26, 39, 27 are so designed that the plate 22 and film remain stationary in the upper position when the claw 62 moves into the interdental spaces of the wheel 72; and the wheel 72, the film and the plate 22 start slowly and the plate moves down from the position of Fig. 1 to the lower limit position of Fig. 6 with about 60 degrees rotation of the cams. When the plate member 22 has reached the position of Fig. 6, the plate member 22, the toothed wheel 72, the master sprocket 71 and the film are stationary; and the cam face 55 engages the ball 61, withdrawing the claw from the then stationary wheel 72 before the plate member 22 starts upward with the claw 62 still withdrawn from the toothed wheel. The film is always stationary when the jaw 62 moves into or out of mesh with the teeth 74. The teeth of the master sprocket 71 are always meshed with the perforations of the film thus avoiding damage to the film perforations.

I claim as my invention:

1. A film feed mechanism comprising a reciprocatory member; a rotary drive shaft having cams thereon; means operated by the cams to reciprocate the member; a sprocket shaft carrying a toothed wheel and a sprocket; a lever pivoted on said member and substantially longitudinally reciprocated by the member and having a claw; an in-and-out cam on said drive shaft against which the said lever is urged, to move the claw to and from the toothed wheel as the lever reciprocates to move the wheel step-by-step.

2. A film feed mechanism comprising a reciprocatory member having fast thereon opposing abutments transverse to its path; a rotary drive shaft; cams fast on said shaft, at all times engageable with said abutments the cams being contoured to reciprocate the member and hold it stationary for a time at each limit of movement; a sprocket shaft below and transverse to said drive shaft carrying a sprocket and a toothed wheel; a lever intermediately pivotally mounted on said member and having at one end a claw engageable in the spaces between the teeth of the wheel; and an in-and-out cam on said drive shaft having a cam face against which the other end of said lever is urged; said cam face being contoured to move the claw to and from said spaces when said member is stationary and to hold the claw in said spaces when said member moves in one direction and away from said spaces when the member moves in the opposite direction.

3. A film feed mechanism comprising a reciprocatory member having fast thereon opposing abutments transverse to its path; a rotary drive shaft; feed and take-up cams fast on said shaft and having peripheral cam faces, the faces of the cams respectively being at all times engageable with said abutments respectively, the peripheral face of the cams being contoured to reciprocate the member and hold it stationary for a time at each limit of movement; a sprocket shaft below and transverse to said drive shaft and carrying a toothed wheel and a sprocket; a lever intermediately pivotally mounted on said member and having a claw engageable in the spaces between the teeth of the toothed wheel; and an in-and-out cam on said drive shaft having a cam face against which the upper end of said lever is urged; said cam face being contoured to move the claw to and from said spaces when said member is stationary and to hold the claw in said spaces when said member moves in one direction and away from said spaces when the member moves in the other direction.

4. In combination a mounting plate; a reciprocatory plate member vertically slidably mounted on said mounting plate; a main shaft rotatably mounted on the mounting plate; means carried respectively by the shaft and reciprocatory plate for reciprocating the latter as the shaft rotates; a cam collar having a hub fast on the main shaft and having a flange provided with an in-and-out cam face; a sprocket shaft carrying a toothed wheel and a film feed sprocket; an oscillatory shaft mounted across said plate member transverse to the path of the latter; a follower lever fast on the oscillatory shaft and having an engagement end engageable with the in-and-out cam face, said lever carrying a lower claw adapted to move in and out to engage between teeth of the toothed wheel.

5. A film feed mechanism comprising a housing; a reciprocatory member therein; a rotary drive shaft mounted in walls of the housing; cams on said drive shaft; means operated by the cams to reciprocate the member; a sprocket shaft mounted across the housing below said drive shaft and carrying a toothed wheel and an exterior sprocket; a lever on said member having a claw; and an in-and-out cam on said drive shaft against which the said lever is urged to move the claw to and from the toothed wheel to move it step-by-step.

6. A film feed mechanism comprising a housing; a reciprocatory member therein; a rotary drive shaft mounted on the walls of the housing; means operated by the shaft to reciprocate the member, a sprocket shaft mounted across the housing below said drive shaft and carrying a toothed wheel and an exterior sprocket; a lever on said reciprocatory member having a claw; and an in-and-out cam on said drive shaft against which the said lever is urged, to move the claw to and from the toothed wheel to move it step-by-step.

7. A film feed mechanism comprising a housing; a vertically reciprocatory plate member therein having lower bearing ears having transverse bores; a rotary drive shaft mounted in walls of the housing; means operated by the shaft to reciprocate the member; a sprocket shaft mounted across the housing below said drive shaft and carrying a toothed wheel and an exterior sprocket; an in-and-out cam on said drive shaft having a transverse cam face; an oscillatory shaft in said transverse bores of the ears; a lever of metal plate fast on the oscillatory shaft between said ears; said lever having a rounded face in engagement with the in-and-out cam face; the upper part of the lever being rearwardly extended and having an upwardly extended end; a ball cup on said end and adjacent to the periphery of said cam face; a bearing ball in said cup engaging the in-and-out cam; a spring urging the upper end of the lever toward the in-and-out cam; the other end portion of the lever extending downwardly and having a rearwardly turned claw engageable between the teeth of the toothed wheel.

8. A film feed mchanism comprising a housing; a vertically reciprocatory member therein; a rotary drive shaft mounted in walls of the housing; means operated by the shaft to reciprocate the member; a sprocket shaft mounted across the housing below said drive shaft and carrying an exterior sprocket; a lever intermediately pivoted on said member having a lower toothed wheel made of hard fiber secured fast on the sprocket shaft in the plane of movement of the claw and provided with teeth each comprising a cylindrical outer portion axially parallel to the sprocket shaft and a narrower inner neck; an in-and-out cam on said drive shaft having a transverse cam face against which said lever is urged to move the claw to and from the spaces between the teeth; said claw being thick and having a rounded end and curved upper and lower faces substantially coaxial with the pivotal axis of the lever; said cam face, the lengths of the lever arms, the faces of the claw and the movements of said member being so related that the claw is in retracted position as it moves upwardly and moves inwardly, out of contact with the tooth next above, while the reciprocatory member is stationary, to slide evenly on the upper face of the cylindrical portion of a tooth next below just above the level of the axis of the sprocket shaft just before the claw moves downward, and engages the cylindrical portions of both adjacent teeth just before the claw is retracted while the reciprocatory member is stationary in its lowest position, thus to prevent overfeed of the toothed wheel; the shape of the curved faces of the claw avoiding movement of the toothed wheel during insertion and retraction of the claw.

9. A film feed mechanism comprising a reciprocatory member; a rotary drive shaft mounted in the walls of the housing; means operated by the shaft to reciprocate the member; a sprocket shaft mounted below said drive shaft transversely thereto and carrying a toothed wheel and sprocket each tooth of the wheel comprising a rounded outer end and a narrow inner end; a lever on said reciprocatory member having a thick claw adapted to snugly engage between said outer ends of adjacent teeth; and an in-and-out cam on said drive shaft against which the said lever is urged, to move the claw to and from the toothed wheel to move it step-by-step.

TILGHMAN G. FREDERICK.

REFERENCES CITED

The following references are of record in the file of this patent:

UNITED STATES PATENTS

| Number | Name | Date |
| --- | --- | --- |
| 623,410 | Miller et al. | Apr. 18, 1899 |
| 646,287 | Hundhausen | Mar. 27, 1900 |
| 957,246 | Paulson | May 10, 1910 |
| 1,262,798 | Huebotter | Apr. 16, 1918 |
| 1,283,661 | Carlson | Nov. 5, 1918 |
| 1,322,304 | Hartley | Nov. 18, 1919 |
| 1,326,410 | McMillan | Dec. 30, 1919 |
| 1,363,290 | Thevenin | Dec. 28, 1920 |
| 1,396,666 | Rix | Nov. 8, 1921 |
| 1,833,339 | Seufert | Nov. 24, 1931 |
| 1,893,189 | Watts et al. | Jan. 3, 1933 |
| 1,968,250 | Frederick et al. | July 31, 1934 |
| 2,008,973 | Tuttle | July 23, 1935 |
| 2,228,773 | Merta | Jan. 14, 1941 |

FOREIGN PATENTS

| Number | Country | Date |
| --- | --- | --- |
| 441 | Great Britain | of 1898 |
| 488,497 | Great Britain | July 7, 1938 |
| 679,932 | Germany | Aug. 17, 1939 |